US007453681B2

(12) United States Patent
Ho

(10) Patent No.: US 7,453,681 B2
(45) Date of Patent: Nov. 18, 2008

(54) METAL OXIDE VARISTOR WITH A HEAT PROTECTION

(75) Inventor: Chang-Wei Ho, Keelung (TW)

(73) Assignee: Thinking Electronic Industrial Co., Ltd. (TW)

(*) Notice: Subject to any disclaimer, the term of this patent is extended or adjusted under 35 U.S.C. 154(b) by 0 days.

(21) Appl. No.: 11/705,680

(22) Filed: Feb. 13, 2007

(65) Prior Publication Data

US 2008/0129440 A1 Jun. 5, 2008

(30) Foreign Application Priority Data

Nov. 30, 2006 (TW) .............................. 95144406 A

(51) Int. Cl.
*H02H 1/00* (2006.01)
*H01C 7/10* (2006.01)
*H01C 7/13* (2006.01)

(52) U.S. Cl. ........................... 361/127; 338/20; 338/21; 338/22

(58) Field of Classification Search ................. 361/127; 338/20–22
See application file for complete search history.

(56) References Cited

U.S. PATENT DOCUMENTS 6,636,403 B2 * 10/2003 McLoughlin et al. ....... 361/103
2007/0200657 A1 * 8/2007 Tsai et al. ..................... 338/21

* cited by examiner

*Primary Examiner*—Michael J Sherry
*Assistant Examiner*—Dharti H Patel
(74) *Attorney, Agent, or Firm*—William E. Pelton, Esq.; Cooper & Dunham LLP

(57) ABSTRACT

A metal oxide varistor integrally formed with a heat protection structure that will automatically go to open circuit in conditions of overheating due to sustained over-voltages. The metal oxide varistor integrally formed with a heat protection structure has a body, an insulation bracket, a number of terminals and a fuse. The insulation bracket is deposited on the body and has a number of slots. The fuse connects to the body and one of the terminals. The fuse is mounted one of the slots of the insulation bracket. The fuse reacts to the overheating timely and the melting fuse spreads quickly with the assistance of capillary action evolved by the slots of the insulation bracket to speed up the action to go to open circuit in against damage due to sustained over-voltages.

8 Claims, 9 Drawing Sheets

METAL OXIDE VARISTOR WITH A HEAT PROTECTION

BACKGROUND OF THE INVENTION

1. Field of the Invention

The present invention is generally directed to a metal oxide varistor having a heat protection, especially to a metal oxide varistor integrally formed with an automatic switching-off structure that automatically goes to open circuit in conditions of overheating due to sustained over-voltages.

2. Description of the Prior Arts

Metal oxide varistors are widely used in circuits as voltage protection elements and inrush-current-absorbing elements. The metal oxide varistors have the capability of clamping high transient voltages appearing on unconditioned power lines to a low level for protecting electrical equipment or devices connected to the line. While the metal oxide varistors have a long life and have the ability to repeatedly clamp high transient voltage spikes to a safe level, the metal oxide varistors do eventually fail and ultimately, even if a catastrophic failure does not occur, the impedance of metal oxide varistors decreases to the point where they present a significant load, and eventually overheat and fail emitting smoke and fumes.

Thus, the protection is generally provided to a metal oxide varistors by connecting the varistors across the power line in series with a current limiting fuse and/or a thermal fuse. If the temperature of the varistor increases beyond the rated temperature of the thermal-fuse, the thermal fuse will open, thereby removing the varistor from the circuit. The thermal-fuses heretofore use to protect electrical circuits from varistor failure are generally cylindrical in shape, and have been mounted on the same printed circuit boards to which the varistor is mounted with the fuse arranged adjacent and parallel to the varistor body. As long as the thermal protective fuse is physically close enough to the varistor, an increase in varistor temperature will increase the temperature of the thermal protective fuse, causing it to open. While these thermal protective fuses heretofore used to protect electrical circuits from varistor failure have been somewhat effective, varistors may overheat in failure if localized overheating occurs at a portion of the varistor body remote from the fuse, the varistor and surrounding areas may be substantially destroyed before the temperature at the location of the fuse increases sufficiently to cause the fuse open. In a further known prior art device, in which a flat thermal fusible layer is deposited on a metal oxide varistor element. Another device provides protection by utilizing a spaced-apart lead from an electrode and is connected to it by a column of solder joints extending outwardly from the electrode. While these varistors appear to be reasonably effective, it still suffers from some drawbacks. It is doubtful whether a reliable insulation gap can be formed after fusing with relying on properties such as outgassing in an epoxy.

To overcome the shortcomings, the present invention provides a metal oxide varistor integrally formed with a heat protection structure for better handling of transient peak currents with desirable improvement of simplified manufacturing to mitigate or obviate the aforementioned problems.

SUMMARY OF THE INVENTION

The main objective of the present invention is to provide a metal oxide varistor integrally formed with a heat protection structure that will automatically go to open circuit in conditions of overheating due to sustained over-voltages. The metal oxide varistor integrally formed with a heat protection structure has a body, an insulation bracket, a number of terminals and a fuse. The insulation bracket is deposited on the body and has a number of slots. The fuse connects to the body and one of the terminals. The fuse is mounted in one of the slots of the insulation bracket. Accordingly, it is an advantage of the invention to provide a varistor that has integrated thermal protection to quickly go to open circuit in against damage due to sustained over-voltages. The fuse reacts to the overheating timely and the melting fuse spreads quickly with the assistance of capillary action evolved by the slot of the insulation bracket to speed up the action to go to open circuit in against damage due to sustained over-voltages. In another embodiment, the fuse is wrapped with the heat shrinkable material. While the temperature of the wrapped heat shrinkable material reaching at or over the rated temperature creating contractive force and the contracting wrapped heat shrinkable material facilitate the speed of the action in melting fused electrode breakdown due to overheating from sustained overvoltage. In still another embodiment, an electrical insulated glue that may be heat-conductive surrounds the electrical joint between the fuse and the body of the metal oxide varistor, and the glue acts to retain the space for the movement of spreading throughout over the body's surface of the melted joints between fuse and body, and/or fuse reaching at or over a threshold safety thermal temperature for the varistor under elevating temperature.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
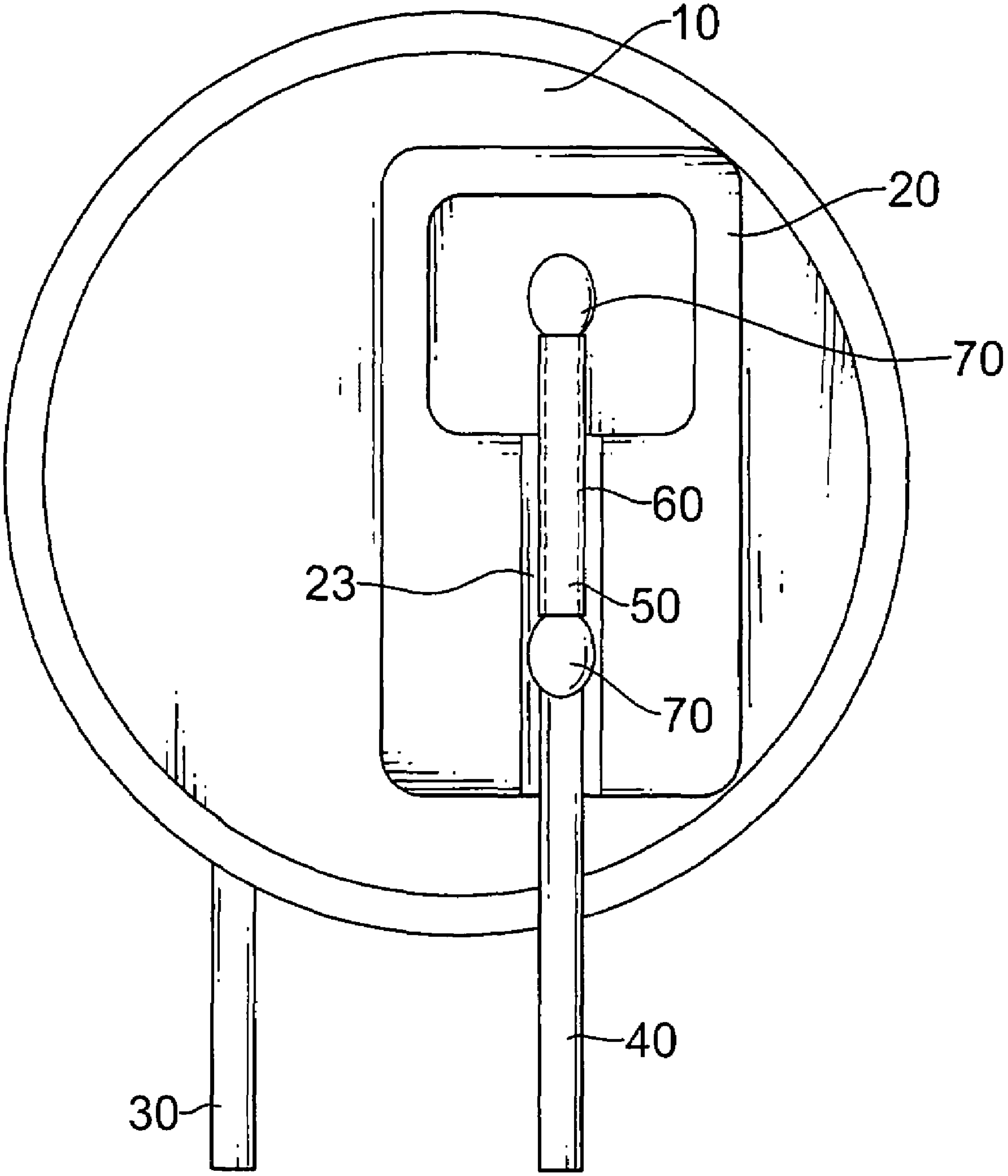
FIG. 1 is a front view of a metal oxide varistor with a heat protection in accordance with the present invention.

With reference to FIGS. 1, 4, 5, 7, 9 and 10, a metal oxide varistor with a heat protection in accordance with the present invention comprises a body (10, 10'), an insulation bracket (20, 20'), a first terminal (30, 30'), a second terminal (40, 40'), a third terminal (401), a fuse (50, 50'), a heat-shrinkable element (60, 60'), multiple solder joints (70, 70') and a glue (80, 80').

The body (10, 10') has a first side and a second side.

Figure 2:
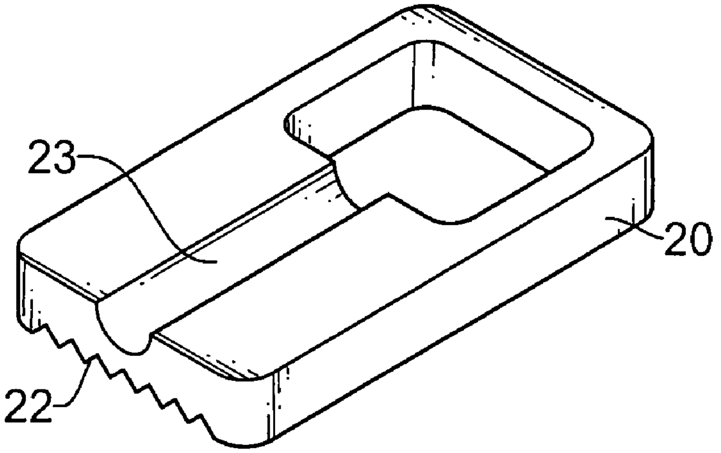
FIG. 2 is a perspective view of an insulation bracket of the metal oxide varistor in FIG. 1.
Figure 3:
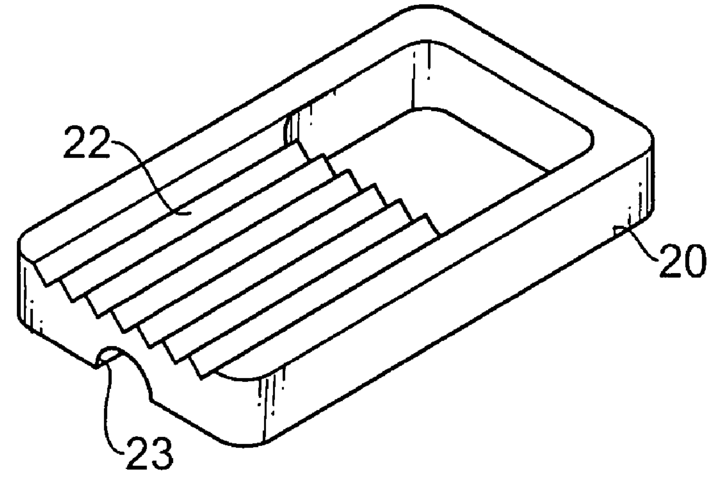
FIG. 3 is another perspective view of the insulation bracket in FIG. 2.
Figure 4:
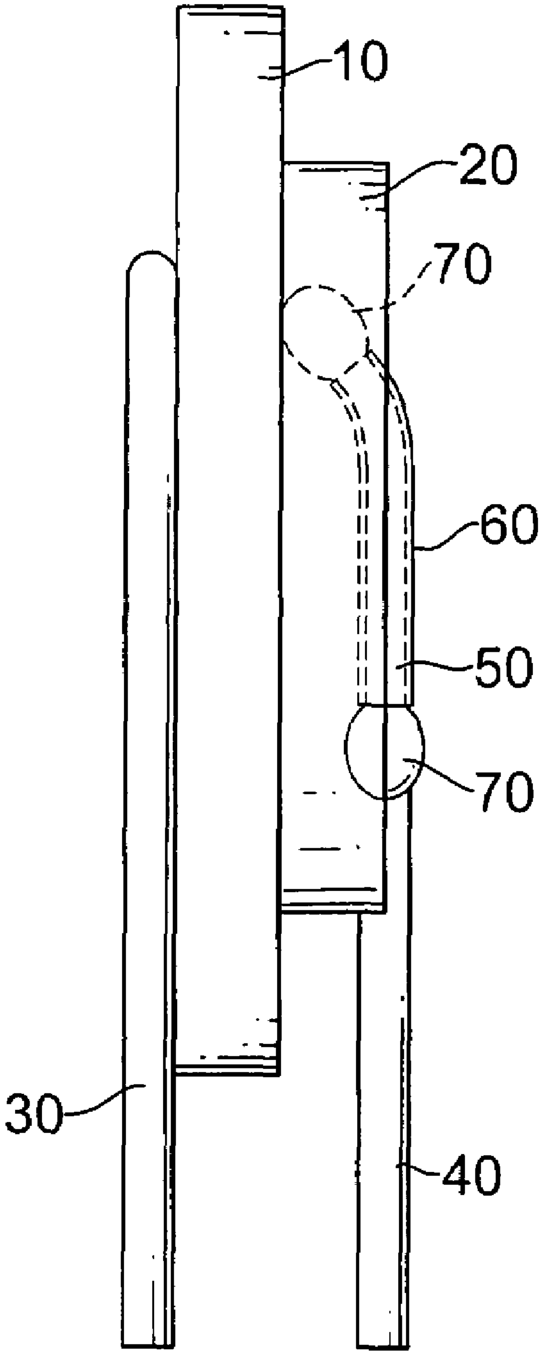
FIG. 4 is a side view of the metal oxide varistor in FIG. 1.
Figure 5:
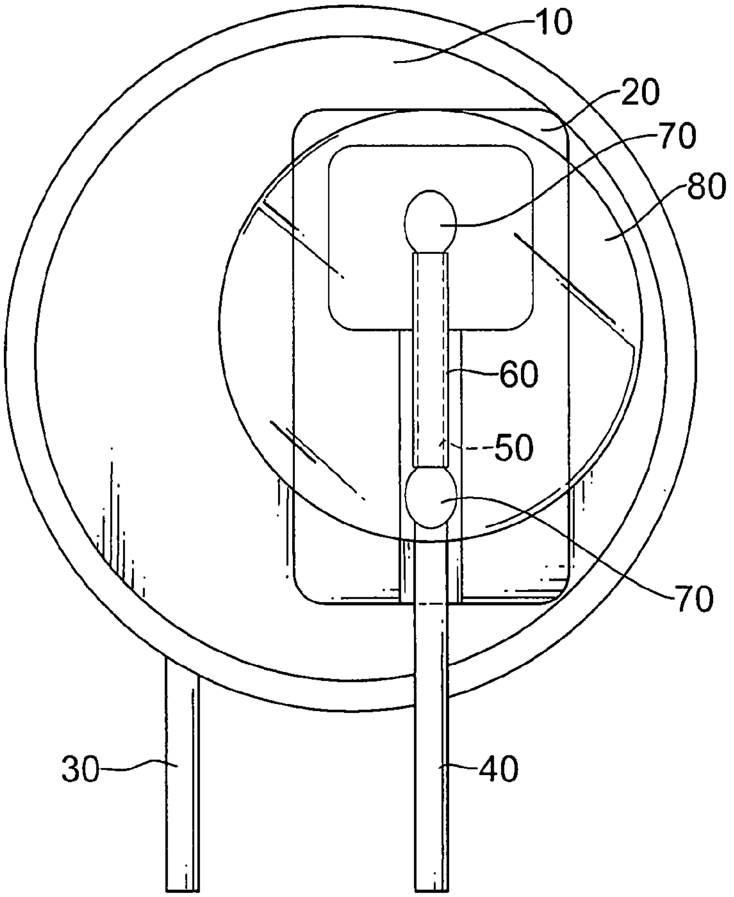
FIG. 5 is a front view of the metal oxide varistor in FIG. 1 with a glue.
Figure 8:
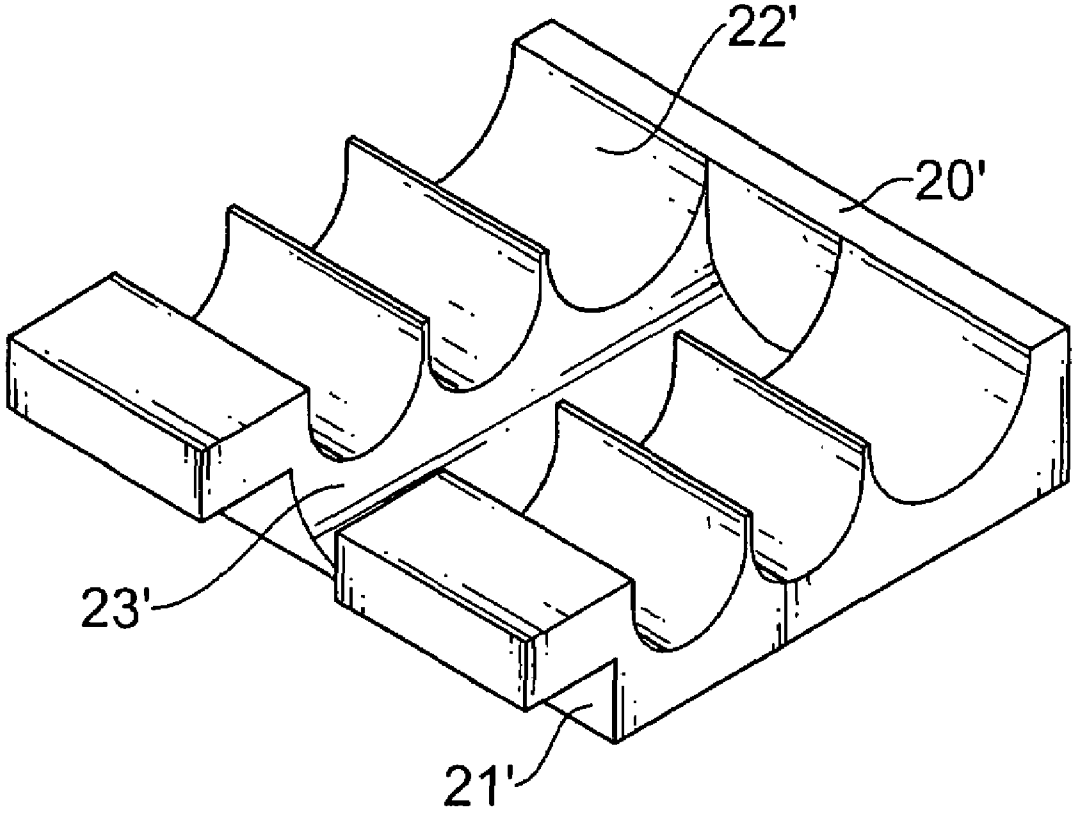
FIG. 8 is a perspective view of an insulation bracket of the metal oxide varistor in FIG. 7.
Figure 9:
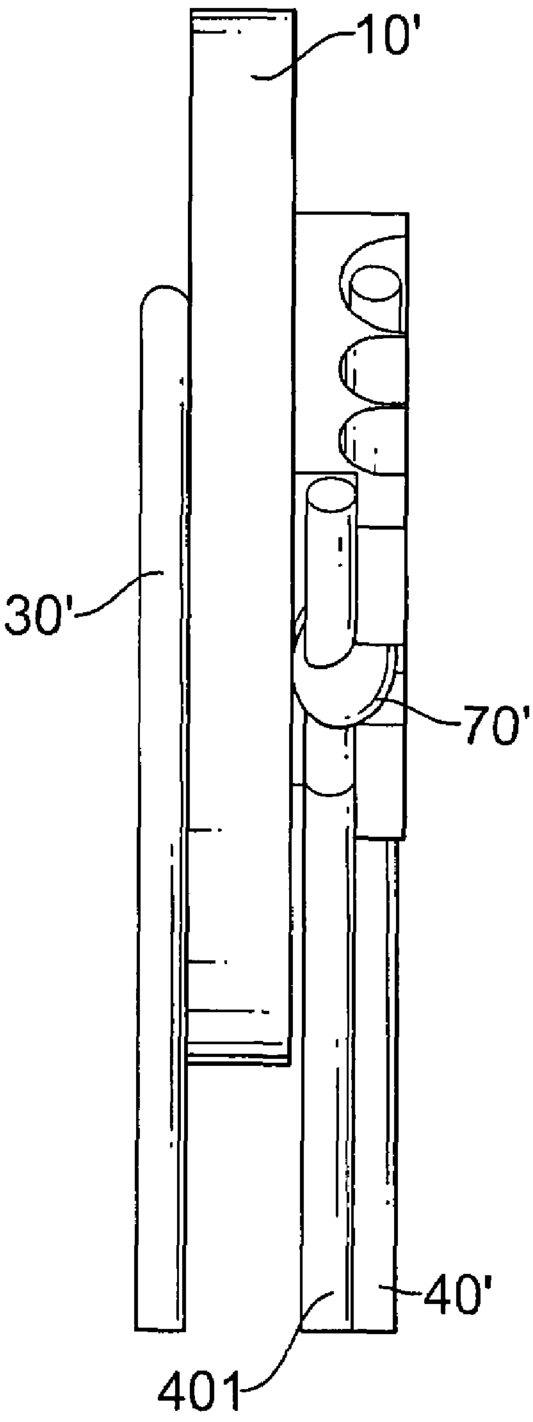
FIG. 9 is a side view of the metal oxide varistor in FIG. 7.
Figure 10:
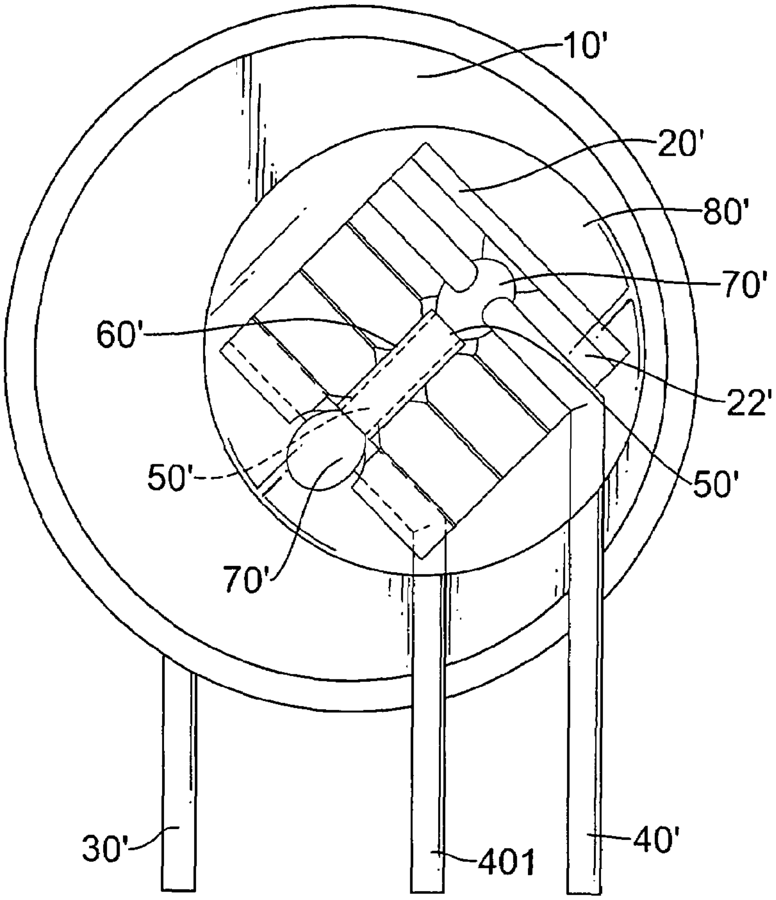
FIG. 10 is a front view of the metal oxide varistor in FIG. 7 with a glue.

With further reference to FIGS. 2, 3 and 8, the insulation bracket (20, 20') is made of ceramics that is a well heat conductor, is insulated from electricity, is attached securely on the first side of the body (10, 10') and has an inner side, an outer side, a longitudinal slot (23, 23'). The inner side of the insulation bracket (20, 20') faces the body (10, 10'). The insulation bracket (20) has multiple teeth (22), or the insulation bracket (20') has a notch (21') and multiple receiving slots (22'). The longitudinal slot (23, 23') is formed in the outer side of the insulation bracket (20, 20'). The teeth (22) are formed separately in the inner side of the insulation bracket (20) and grip the first side of the body (10). The notch (21') is formed in the inner side of the insulation bracket (20'). The receiving slots (22') are formed separately in the outer side of the insulation bracket (20') and are perpendicular to and communicate with the longitudinal slot (23') in the insulation bracket (20').

The first terminal (30, 30') is attached to and electrically connects to the second side of the body (10, 10').

The second terminal (40, 40') is attached to the outer side of the insulation bracket (20, 20'). The second terminal (40) is mounted in the longitudinal slot (23) in the insulation bracket (20), or the second terminal (40') is mounted in one of the receiving slots (22') in the insulation bracket (20') across the longitudinal slot (23').

Figure 12:
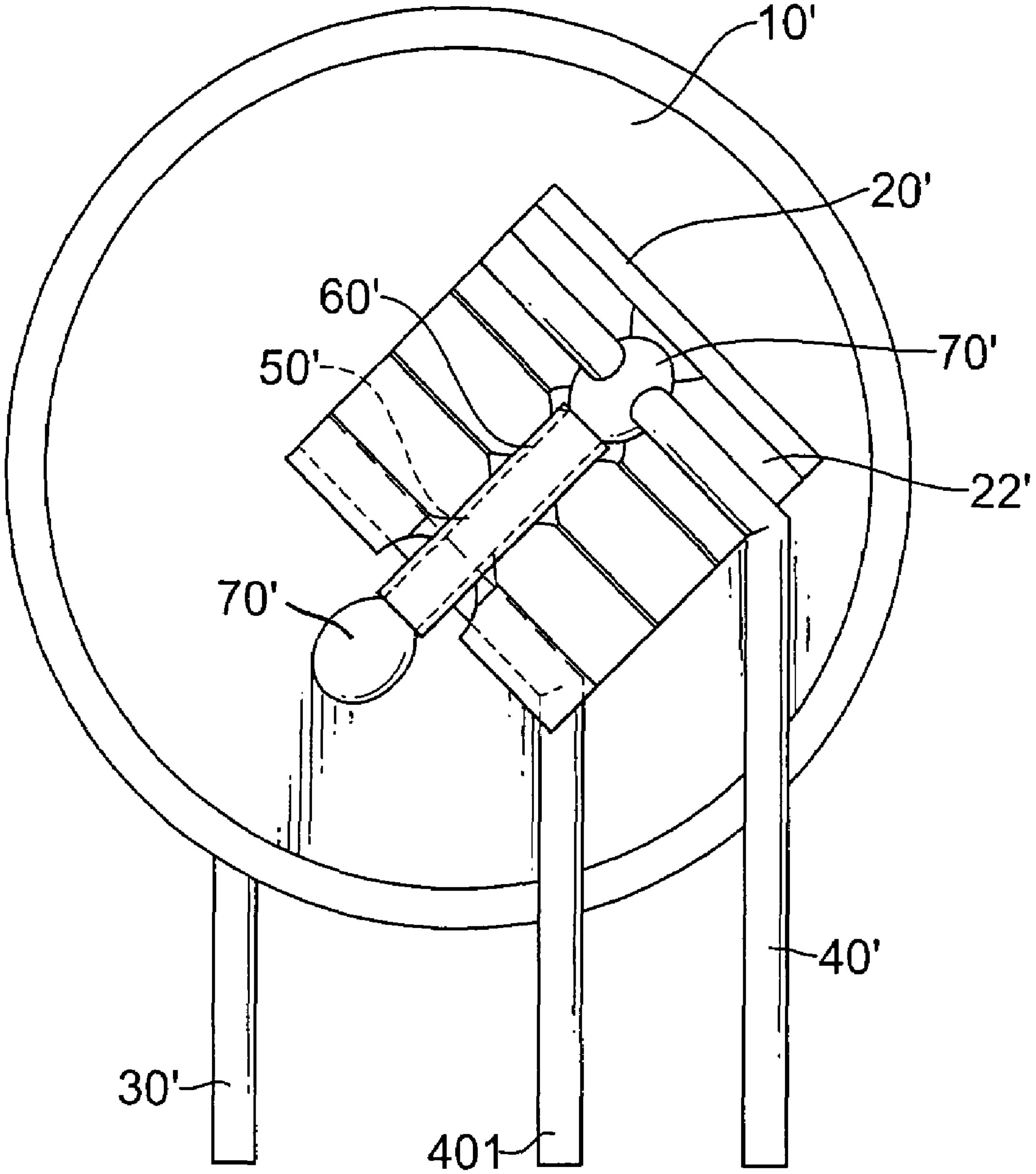
FIG. 12 is a front view of another embodiment of a metal oxide varistor with a heat protection in accordance with the present invention.

With further reference to FIG. 12, the third terminal (401) is mounted in the notch (21 ') in the insulation bracket (20') and electrically connects to the body (10') or electrically connects between the body (10') and the fuse (50').

The fuse (50, 50') is mounted in the longitudinal slot (23, 23') in the insulation bracket (20, 20'). The fuse (50) electrically connects between the second terminal (40) and the body (10), or the fuse (50') electrically connects between the second terminal (40') and the body (10') and/or the third terminal (401).

The heat-shrinkable element (60, 60) is wrapped securely around the fuse (50, 50') and is mounted in the longitudinal slot (23, 23') of the insulation bracket (20, 20'). The heat-shrinkable element (60, 60') is insulated from electricity and shrinks when the heat-shrinkable element (60, 60') is overheated at or over a rated temperature. The heat-shrinkable element (60, 60') may be Flame-retarded heat shrinkable Polyethylene tube, heat shrinkable polyvinyl chloride tube, Silicone rubber heat shrinkable tube etc. When the heat-shrinkable element (60, 60') shrinks, the heat-shrinkable element (60, 60') strongly contracted and forces the melting fuse (50, 50') to quickly disconnect the joint between melting fuse (50, 50') and the body (10, 10').

The solder joints (70, 70') are formed between the second terminal (40, 40') and the fuse (50, 50'), the fuse (50, 50') and the body (10, 10'), and the fuse (50') and the third terminal (401) to electrically connect those components.

Figure 6:
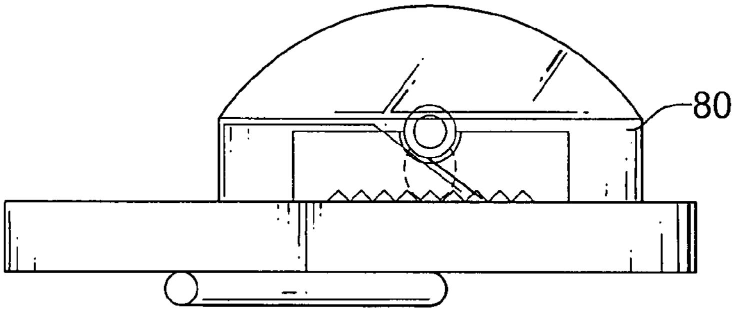
FIG. 6 is a side view of the metal oxide varistor in FIG. 1 with the glue.
Figure 7:
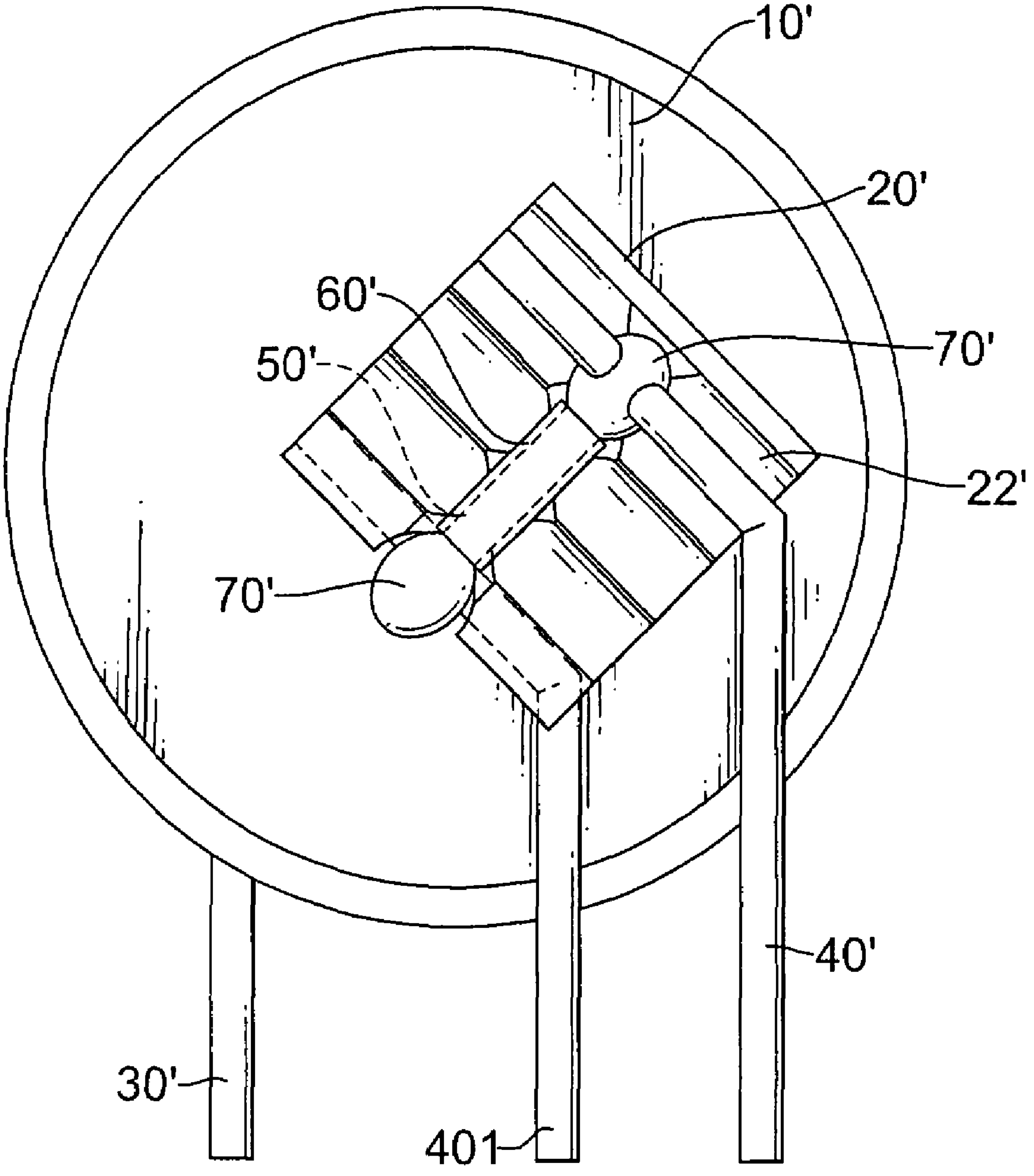
FIG. 7 is a front view of another embodiment of a metal oxide varistor with a heat protection in accordance with the present invention.
Figure 11:
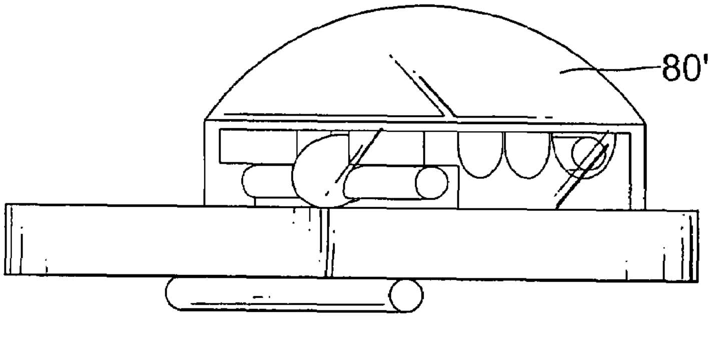
FIG. 11 is a side view of the metal oxide varistor in FIG. 7 with the glue.

With further reference to FIGS. 6 and 11, the glue (80, 80') is insulated from electricity and may be a well heat conductor. The glue (80, 80') is mounted on the body (10, 10') and covers the fuse (50, 50') and the heat-shrinkable element (60, 60') to retain the space for the movement of spreading throughout over the body's surface of the melted joints (70, 70') between fuse (50, 50') and body (10, 10'), and/or fuse (50, 50') reaching at or over a threshold safety thermal temperature for the varistor under elevating temperature.

The body (10, 10') is over heated while the metal oxide varistor continually suffer from a sustained over-voltage. The insulation bracket (20, 20') facilitate the heat transfer to quickly conduct the heat from the body (10, 10') to the solder joint (70, 70') of the fuse (50, 50') on the insulation bracket (20, 20'). The fuse (50, 50') in the slots (23, 23') reacts to the overheating timely and the melting fuse (50, 50') spreads quickly with the assistance of capillary action evolved by the slot (23, 23') to speed up the action to go to open circuit in against damage due to sustained over-voltages Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A metal oxide varistor with a heat protection comprising:
a body having a first side and a second side;
an insulation bracket attached securely on the first side of the body and having
an inner side facing the body;
an outer side;
a longitudinal slot formed in the outer side of the insulation bracket; and
multiple receiving slots formed separately in the outer side of the insulation bracket and perpendicular to and communicating with the longitudinal slot in the insulation bracket and mounted in one of the receiving slot of the insulation bracket;
a first terminal attached to and electrically connecting to the second side of the body;
a second terminal attached to the insulation bracket and mounted in one of the receiving slots of the insulation bracket;
a fuse mounted in the longitudinal slot of the insulation bracket and connecting between the second terminal and the body; and
two solder joints respectively formed between the second terminal and the fuse and between the fuse and the body.

2. The metal oxide varistor as claimed in claim 1 further comprising a heat-shrinkable element wrapped securely around the fuse and mounted in the longitudinal slot of the insulation bracket.

3. The metal oxide varistor as claimed in claim 1, wherein the insulation bracket further has a notch formed in the inner side of the insulation bracket; and
a third terminal mounted in the notch of the insulation bracket and connecting between the body and the fuse.

4. The metal oxide varistor as claimed in claim 3 further comprising a heat-shrinkable element securely wrapped around the fuse and mounted in the longitudinal slot of the insulation bracket.

5. The metal oxide varistor as claimed in claim 1, wherein the insulation bracket further has a notch formed in the inner side of the insulation bracket; and
a third terminal mounted in the notch of the insulation bracket and connecting to the body.

6. The metal oxide varistor as claimed in claim 5 further comprising a heat-shrinkable element securely wrapped around the fuse and mounted in the longitudinal slot of the insulation bracket.

7. The metal oxide varistor as claimed in claim 4 further comprising an electrical insulated glue mounted on the body and covering the fuse.

8. The metal oxide varistor as claimed in claim 7, wherein the electrical insulated glue is a heat conductor.

* * * * *